(12) United States Patent
Tamaizumi et al.

(10) Patent No.: US 8,775,027 B2
(45) Date of Patent: Jul. 8, 2014

(54) ELECTRIC POWER STEERING SYSTEM

(71) Applicant: JTEKT Corporation, Osaka (JP)

(72) Inventors: Terutaka Tamaizumi, Okazaki (JP);
Hirozumi Eki, Okazaki (JP); Masayuki Kita, Okazaki (JP); Isao Namikawa, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/958,118

(22) Filed: Aug. 2, 2013

(65) Prior Publication Data
US 2014/0058629 A1    Feb. 27, 2014

(30) Foreign Application Priority Data
Aug. 22, 2012   (JP) .................................. 2012-183355

(51) Int. Cl.
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |

(52) U.S. Cl.
USPC ............................................. 701/42; 701/41

(58) Field of Classification Search
USPC .......................................... 701/41, 42, 71, 91
See application file for complete search history.

(56) References Cited

U.S. PATENT DOCUMENTS

| 2002/0005314 A1* | 1/2002 | Takehara et al. .............. 180/443 |
| 2002/0125063 A1* | 9/2002 | Kurishige et al. ............. 180/443 |
| 2003/0074120 A1* | 4/2003 | Kleinau .......................... 701/41 |
| 2012/0197493 A1* | 8/2012 | Fujimoto et al. ............... 701/41 |

FOREIGN PATENT DOCUMENTS

JP    A-2006-175940    7/2006

* cited by examiner

Primary Examiner — Imran Mustafa
(74) Attorney, Agent, or Firm — Oliff PLC

(57) ABSTRACT

An electric power steering system includes a motor control device that controls, based on an assist command value, driving of a motor that gives an assist torque to a steering mechanism. The motor control device computes a first assist component based on a steering torque and a vehicle speed. A steered-angle command value is computed based on the steering torque and the first assist component, and a second assist component is computed by performing a feedback control that matches the steered angle with the steered-angle command value. The motor control device adds the second assist component to the first assist component so as to compute an assist command value. The motor control device includes a road information compensation portion that decreases an absolute value of the second assist component included in the assist command value when a skid is detected by a vehicle state detecting portion.

4 Claims, 7 Drawing Sheets

ELECTRIC POWER STEERING SYSTEM

INCORPORATION BY REFERENCE/RELATED APPLICATION

This application claims priority to Japanese Patent Application No. 2012-183355 filed on Aug. 22, 2012 the disclosure of which, including the specification, drawings and abstract, is incorporated herein by reference in its entirety.

BACKGROUND OF THE INVENTION

1. Field of the Invention

The invention relates to an electric power steering system that assists steering operation of a driver.

2. Discussion of Background

There has been known an electric power steering system that assists steering operation of a driver by giving power of a motor to a vehicle steering mechanism. Conventionally, as the electric power steering system of this type, there is a system described in JP2006-175940 A.

An electric power steering system described in JP2006-175940 A includes a first normative model that determines a target steering torque based on a steering angle, and a second normative model that determines a target rudder angle (a target steered angle) of a steering system based on a steering torque. Driving of a motor is controlled based on these normative models (ideal models). That is, it is possible to constantly maintain the steering torque at an optimal value by a first assist component obtained by performing torque feedback control to cause an actual steering torque to follow the target steering torque. Further, it is also possible to cancel reverse input vibration from steered wheels by a second assist component obtained by performing steered-angle feedback control to cause an actual steered angle to follow the target steered angle.

In the meantime, for example, in a case where a vehicle that is running on a low μ road (a road with a low friction coefficient μ) skids when the vehicle is turning, an oversteering state occurs. In this case, a driver may operate a steering wheel in a reverse direction with respect to a turning direction of the vehicle so as to steer steered wheels in the reverse direction with respect to the turning direction of the vehicle. This operation is effective for stabilizing the vehicle, and is generally called counter steering.

On the other hand, in the electric power steering system described in JP2006-175940 A, if a steered angle of the steered wheels is changed so as to be apart from the target steered angle at the time when the driver performs counter steering, an assist torque to bring the steered angle back to the target steered angle acts on a steering mechanism. That is, an assist torque in a reverse direction with respect to a direction of the counter steering acts on the steering mechanism. Therefore, a reaction felt by the driver at the time of the counter steering becomes large, which may cause the driver to feel the sense of discomfort.

SUMMARY OF THE INVENTION

The invention provides an electric power steering system that is able to reduce the sense of discomfort felt by a driver due to a steered-angle feedback control when counter steering is performed.

According to a feature of an example of the invention, an electric power steering system includes: an assist mechanism that gives an assist torque from a motor to a vehicle steering mechanism; a control portion that controls driving of the motor based on an assist command value; and a vehicle state detecting portion that detects a skid of the vehicle, wherein the control portion includes: a first assist component computing portion that computes a first assist component based on a steering torque transmitted to the vehicle steering mechanism; a steered-angle command value computing portion that computes, based on the steering torque, a steered-angle command value that serves as a target value for a steered angle of steered wheels; a second assist component computing portion that computes a second assist component by performing a steered-angle feedback control that matches the steered angle of the steered wheels with the steered-angle command value; an assist command value computing portion that computes the assist command value based on a value obtained by adding the second assist component to the first assist component; and an adjustment portion that decreases, when the skid of the vehicle is detected by the vehicle state detecting portion, an absolute value of the second assist component included in the assist command value, as compared to when no skid of the vehicle is detected.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
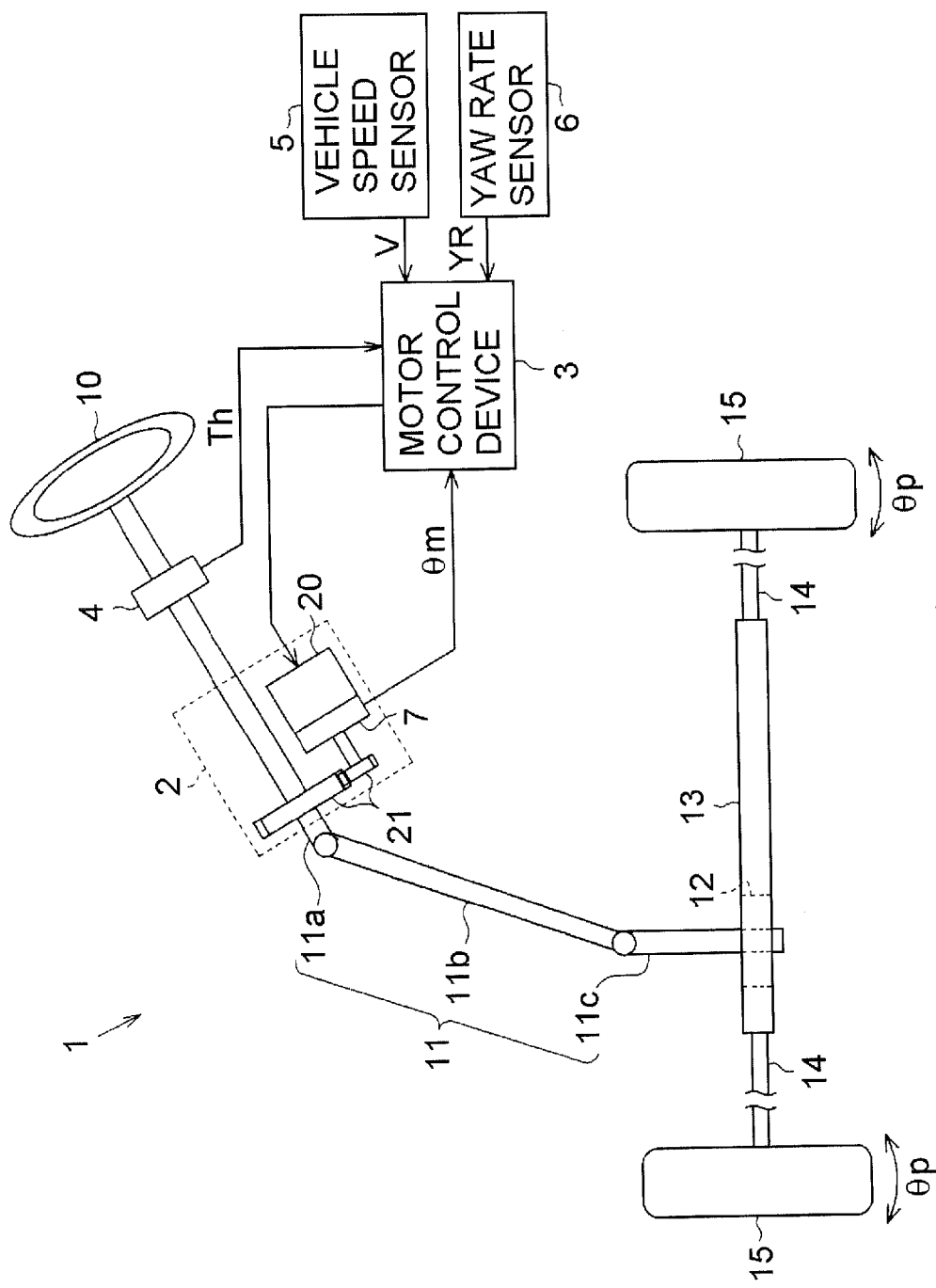
FIG. 1 is a block diagram illustrating a configuration of an electric power steering system according to an embodiment of the invention.

An embodiment of an electric power steering system of the invention will be described with reference to FIG. 1 to FIG. 7. As illustrated in FIG. 1, the electric power steering system includes a steering mechanism 1 that steers steered wheels 15 based on operation of a steering wheel 10 performed by a driver, and an assist mechanism 2 that assists the steering operation performed by the driver.

The steering mechanism 1 includes a steering shaft 11 that rotates together with the steering wheel 10. The steering shaft 11 includes a column shaft 11a connected to a center of the steering wheel 10, an intermediate shaft 11b, and a pinion shaft 11c. A rack shaft 13 is connected to a lower end of the pinion shaft 11c via a rack-and-pinion mechanism 12. Thus, when the steering shaft 11 rotates in association with the steering operation performed by the driver, its rotary motion is converted to a reciprocating linear motion of the rack shaft 13 in an axial direction via the rack-and-pinion mechanism 12. The reciprocating linear motion of the rack shaft 13 is transmitted to the steered wheels 15 via tie rods 14 connected to respective ends of the rack shaft 13, and thus, a steered angle θp of the steered wheels 15 is changed. Accordingly, a travelling direction of a vehicle is changed.

The assist mechanism 2 includes a motor 20 that gives an assist torque to the column shaft 11a. The motor 20 is constituted by a three-phase alternating current motor. When rotation of the motor 20 is transmitted to the column shaft 11a via a gear mechanism 21, a motor torque is given to the steering shaft 11, and thus the steering operation is assisted.

Further, this electric power steering system is provided with various sensors that detect an operation amount of the steering wheel 10 and a vehicle state amount. For example, the column shaft 11a is provided with a torque sensor 4 that detects a torque (a steering torque) Th given to the steering shaft 11 when the steering operation is performed by the driver. The vehicle is provided with a vehicle speed sensor 5 that detects a running speed V, and a yaw rate sensor 6 that detects a yaw rate YR, which is a rate of change in a rotation angle of a vehicle body in a turning direction. The motor 20 is provided with a rotation angle sensor 7 that detects a rotation angle θm thereof. Outputs of these sensors are taken into a motor control device (a control portion) 3. The motor control device 3 controls driving of the motor 20 based on the outputs of the respective sensors.

Figure 2:
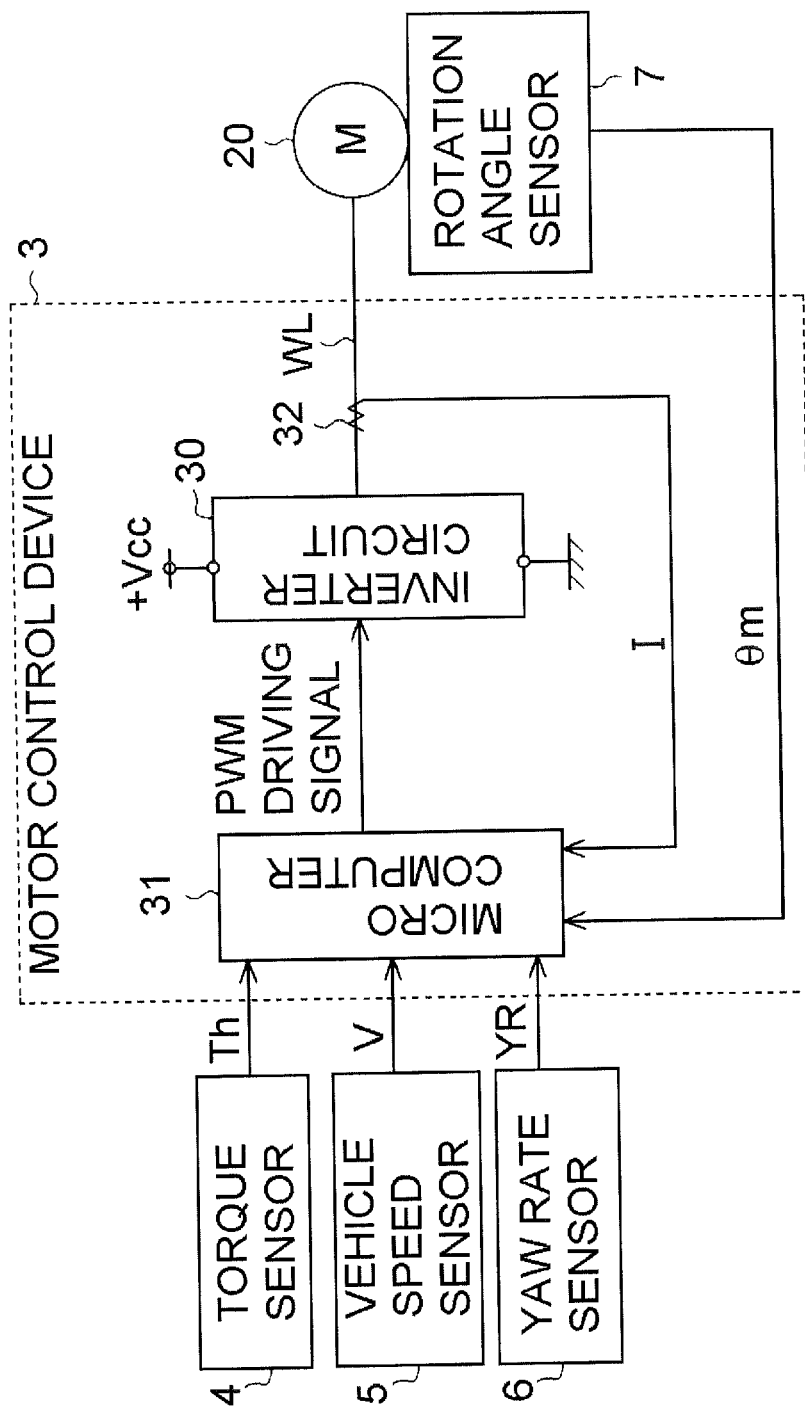
FIG. 2 is a block diagram illustrating a configuration of a motor control device of the electric power steering system according to the embodiment.

As illustrated in FIG. 2, the motor control device 3 includes an inverter circuit 30 that converts a direct current supplied from a power source (a power source voltage "+Vcc") such as an in-vehicle battery, to three-phase (U phase, V phase, W phase) alternating currents, and a microcomputer 31 that drives the inverter circuit 30 through pulse width modulation (PWM).

The inverter circuit 30 converts the direct current supplied from the power source to the three-phase alternating currents based on a PWM driving signal from the microcomputer 31. The three-phase alternating currents are supplied to the motor 20 via an electric supply line WL.

The electric supply line WL is provided with a current sensor 32 that detects a current value I for each phase, which is the value of the current in each phase flowing through the electric supply line WL. An output of the current sensor 32 is taken into the microcomputer 31. Outputs of the torque sensor 4, the vehicle speed sensor 5, the yaw rate sensor 6, and the rotation angle sensor 7 are also taken into the microcomputer 31. The microcomputer 31 generates the PWM driving signal based on the steering torque Th, the vehicle speed V, the yaw rate YR, the motor rotation angle θm, and the current value I for each phase, which are detected by the respective sensors. The microcomputer 31 outputs the PWM driving signal to the inverter circuit 30 to drive the inverter circuit 30 through PWM, thereby controlling driving of the motor 20.

Figure 3:
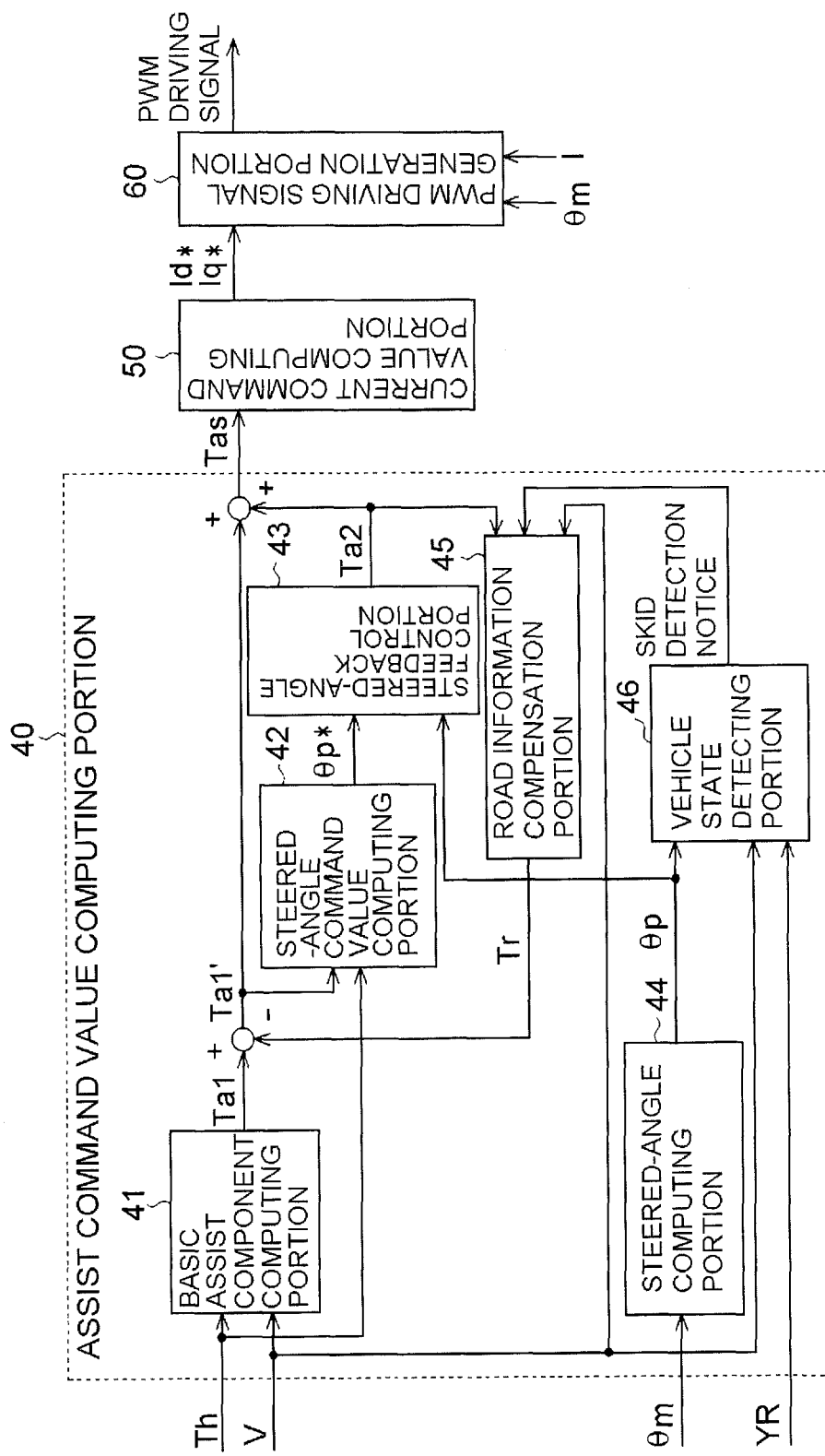
FIG. 3 is a control block diagram illustrating the configuration of the motor control device of the electric power steering system according to the embodiment.

The control of driving of the motor 20 performed by the microcomputer 31 will be described in detail, with reference to a control block of FIG. 3. As illustrated in FIG. 3, the microcomputer 31 includes an assist command value computing portion 40 that computes an assist command value Tas based on the steering torque Th, the vehicle speed V, the motor rotation angle θm, and the yaw rate YR.

Figure 4:
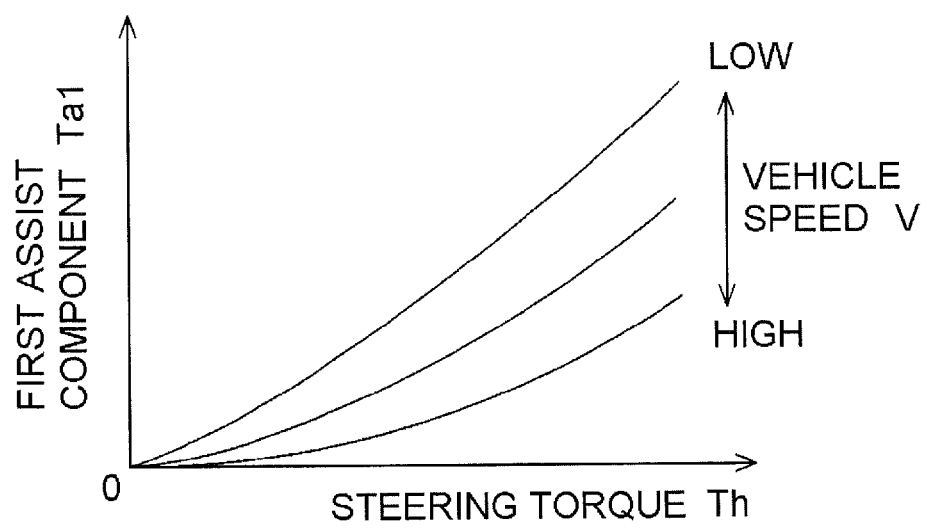
FIG. 4 is a graph illustrating a relationship between a steering torque, a vehicle speed, and a first assist component.

The assist command value computing portion 40 includes a basic assist component computing portion (a first assist component computing portion) 41 that computes a first assist component Ta1, which is a basic component of the assist command value Tas. The basic assist component computing portion 41 sets an absolute value of the first assist component Ta1 so that the absolute value of the first assist component Ta1 is increased as an absolute value of the steering torque Th is increased, and as the vehicle speed V is decreased, as illustrated in FIG. 4. The basic assist component computing portion 41 computes the first assist component Ta1 based on the vehicle speed V and the steering torque Th with the use of a map as illustrated in FIG. 4.

As illustrated in FIG. 3, the assist command value computing portion 40 performs correction to subtract a correction value Tr from a value of the first assist component Ta1 computed by the basic assist component computing portion 41, and inputs a corrected first assist component Ta1' into a steered-angle command value computing portion 42.

The steered-angle command value computing portion 42 also receives information on the steering torque Th as well as the corrected first assist component Ta1'. The steered-angle command value computing portion 42 computes a driving torque Td by adding the corrected first assist component Ta1' to the steering torque Th, and computes a steered-angle command value θp* from the driving torque Td thus computed, based on an ideal model. The steered-angle command value θp* is a target value for the steered angle θp. The ideal model of the present embodiment is set as follows.

The ideal model is separated into an EPS-side ideal model that depends on characteristics of respective elements constituting the electric power steering system, such as the steering shaft 11 and the motor 20, and a vehicle-side ideal model that depends on a characteristic of a vehicle side in which the electric power steering system is provided. The EPS-side ideal model is able to be configured by a viscous term that is in proportion to a first-order time differential value θp' of the steered angle θp and an inertial term that is in proportion to a second-order time differential value θp" of the steered angle θp. The viscous term is determined by a friction or the like that acts between the steering mechanism 1 and a housing or the like that covers an area surrounding the steering mechanism 1. The inertial term is determined by an inertial motion generated in the steering mechanism 1 when the steering operation is performed by the driver. On the other hand, the vehicle-side ideal model is able to be configured by a spring term that is in proportion to the steered angle θp. The spring term is determined by specifications of a suspension and a wheel alignment of the vehicle, a grip force of the steered wheels 15, and so on. In view of this, in the present embodiment, the driving torque Td is modeled as a sum of the spring term, the viscous term, and the inertial term. That is, when a spring coefficient, which is a proportional constant of the spring term, is K, a viscosity coefficient, which is a proportional constant of the viscous term, is C, and an inertia moment, which is a proportional constant of the inertial term, is J, the driving torque Td is modeled by the following formula (1):

$$Td = K \times \theta p + C \times \theta p' + J \times \theta p'' \qquad (1)$$

Figure 5:
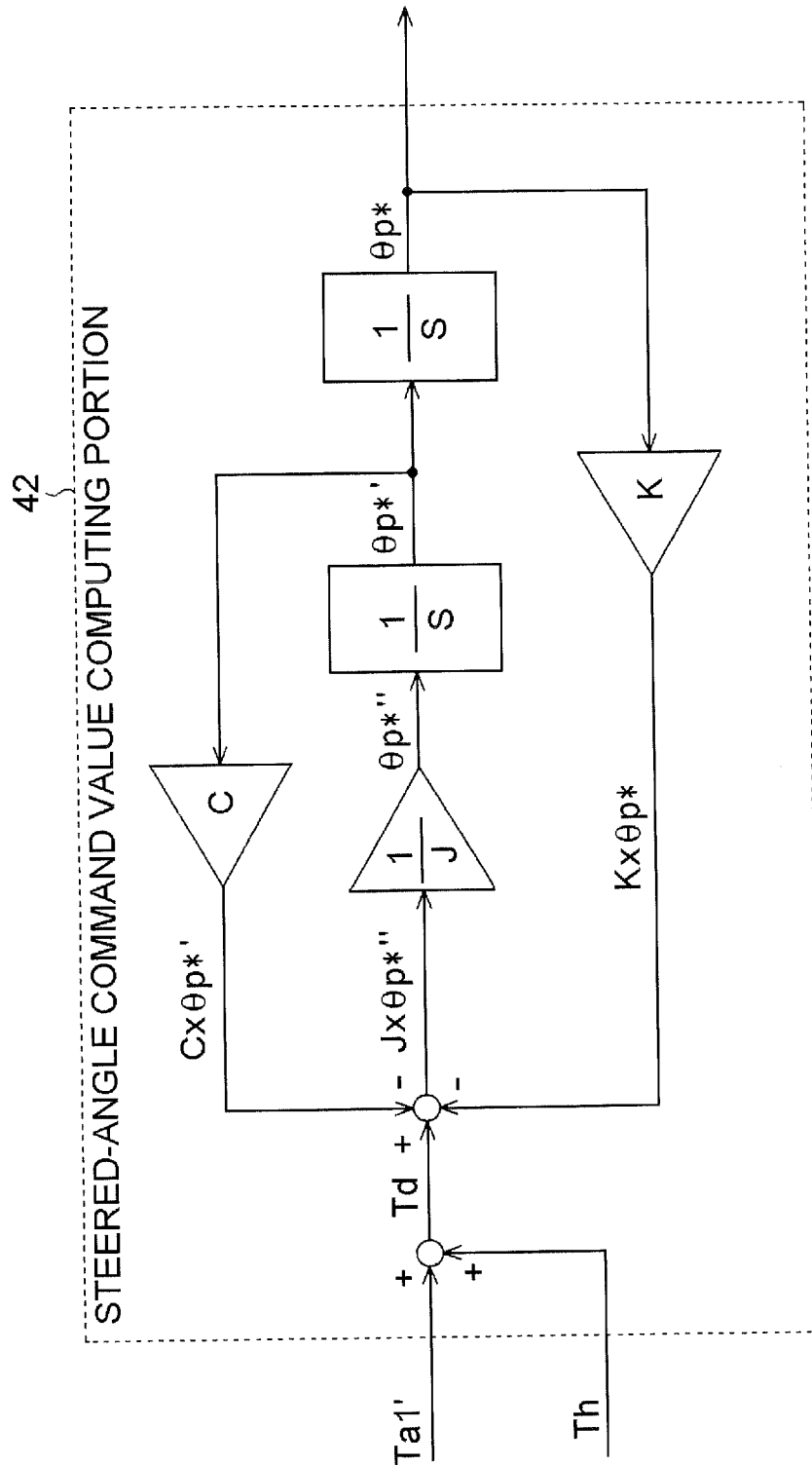
FIG. 5 is a control block diagram illustrating a configuration of a steered-angle command value computing portion of the electric power steering system according to the embodiment.

The steered-angle command value computing portion 42 computes the steered-angle command value θp* based on the driving torque Td with the use of the formula (1). More specifically, as illustrated in FIG. 5, the steered-angle command value computing portion 42 initially calculates the driving torque Td by adding the corrected first assist component Ta1' to the steering torque Th. Then, the inertial term "J×θp*"" is calculated by subtracting the spring term "K×θp*" and the viscous term "C×θp*"" from the driving torque Td. Subsequently, the inertial term "J×θp*"" is divided by the inertia moment J so as to calculate the second-order time differential value $\theta p^{*''}$, and then, the second-order time differential value $\theta p^{*''}$ is integrated so as to calculate the first-order time differential value $\theta p^{*'}$. Furthermore, the first-order time differential value $\theta p^{*'}$ is further integrated so as to calculate the steered-angle command value $\theta p^*$. Then, as illustrated in FIG. 3, the steered-angle command value computing portion 42 outputs the steered-angle command value $\theta p^*$ thus computed, to a steered-angle feedback control portion 43.

In the meantime, as illustrated in FIG. 1, since the motor 20 is connected to the column shaft 11a via the gear mechanism 21, the motor rotation angle $\theta m$ is correlated with a rotation angle of the steering shaft 11. In view of this, the motor rotation angle $\theta m$ is also correlated with the steered angle $\theta p$ of the steered wheels 15. As illustrated in FIG. 3, the assist command value computing portion 40 includes a steered-angle computing portion 44 that computes the steered angle $\theta p$ of the steered wheels 15 based on the motor rotation angle $\theta m$ with the use of such correlations. The steered-angle computing portion 44 outputs the steered angle $\theta p$ thus computed, to the steered-angle feedback control portion 43.

The steered-angle feedback control portion 43 generates a second assist component Ta2 by performing a feedback control based on a difference between the steered angle $\theta p$ and the steered-angle command value $\theta p^*$ so that the steered angle $\theta p$ is matched with the steered-angle command value $\theta p^*$. Thus, in the present embodiment, the steered-angle feedback control portion 43 serves as a second assist component computing portion.

The assist command value computing portion 40 calculates the assist command value Tas by adding the corrected first assist component Ta1' to the second assist component Ta2, and outputs the assist command value Tas to a current command value computing portion 50.

The current command value computing portion 50 computes a current command value Iq* on a q axis in a d/q coordinate system based on the assist command value Tas, and outputs the current command value Iq* to a PWM driving signal generation portion 60. Note that, in the present embodiment, a current command value Id* on a d axis is "0," and the current command value computing portion 50 also outputs the current command value Id* to the PWM driving signal generation portion 60.

The PWM driving signal generation portion 60 also receives information on the current value I for each phase and the motor rotation angle $\theta m$, as well as the current command values Id* and Iq* from the current command value computing portion 50. The PWM driving signal generation portion 60 converts the current value I for each phase to a d-axis current value and a q-axis current value in the d/q coordinate system with the use of the motor rotation angle $\theta m$. Then, the PWM driving signal generation portion 60 generates the PWM driving signal by performing feedback controls based on a difference between the d-axis current value and the current command value Id* and a difference between the q-axis current value and the current command value Iq* so that the d-axis current value is matched with the current command value Id* and the q-axis current value is matched with the current command value Iq*. Thus, the inverter circuit 30 is driven through PWM, and the assist torque is given to the steering shaft 11 from the motor 20.

With this configuration, since the second assist component Ta2 generated by the steered-angle feedback control is included in the assist command value Tas, the steered angle $\theta p$ of the steered wheels 15 is controlled so as to follow the steered-angle command value $\theta p^*$. Due to the steered-angle feedback control, the steered angle $\theta p$ of the steered wheels 15 is maintained at the steered-angle command value $\theta p^*$, and thus, it is possible to appropriately suppress vibration of the steering mechanism 1 caused due to disturbance. Further, by appropriately adjusting respective values of the spring coefficient K, the viscosity coefficient C, and the inertia moment J in the steered-angle command value computing portion 42 as illustrated in FIG. 5, it is possible to form an arbitrary characteristic by control regardless of actual characteristics of the vehicle in which the electric power steering system is provided. That is, it is possible to realize a desired steering feel.

As described above, when the steered-angle feedback control is performed, it is possible to effectively cancel a reverse input from the steered wheels 15. However, the driver acquires much road information related to a running vehicle, such as a road surface state and a grip force of the steered wheels 15, from the reverse input transmitted to the steering wheel 10 via the steering mechanism 1. In view of this, if the reverse input from the steered wheels 15 is completely cancelled, the driver cannot obtain the road information from the steering wheel 10, and as a result, the steering feel may deteriorate. Further, reverse input vibration occurring during straight-ahead braking increases in accordance with the vehicle speed V. Therefore, when the vehicle runs at a high speed, it is desirable to suppress the reverse input vibration so as to secure vehicle running stability. In view of this, in the present embodiment, while the vehicle is running at a low speed, an absolute value of the second assist component Ta2 included in the assist command value Tas is decreased.

Further, in a case where the steered-angle feedback control is performed, when the vehicle skids and the driver performs counter steering, a torque in a reverse direction with respect to a direction of the counter steering may act on the steering mechanism 1. This causes the driver to feel a sense of discomfort. In view of this, in the present embodiment, the absolute value of the second assist component Ta2 included in the assist command value Tas is decreased even when the skid of the vehicle is detected.

Note that, in the present embodiment, as illustrated in FIG. 3, the second assist component Ta2 included in the assist command value Tas is substantially adjusted by subtracting the correction value Tr from the first assist component Ta1. Hereinafter, a method of computing the correction value Tr will be described in detail.

As illustrated in FIG. 3, the assist command value computing portion 40 includes a vehicle state detecting portion 46 that detects a skid of the vehicle and a road information compensation portion 45 that computes the correction value Tr.

Information on the vehicle speed V, the yaw rate YR, and the steered angle $\theta p$ computed by the steered-angle computing portion 44 is taken into the vehicle state detecting portion 46. The vehicle state detecting portion 46 computes an estimated yaw rate YRe of the vehicle body based on the steered angle $\theta p$ and the vehicle speed V. When a difference between the estimated yaw rate YRe and an actual yaw rate YR is equal to or larger than a first threshold or is equal to or smaller than a second threshold, the vehicle state detecting portion 46 determines that the vehicle has skidded. When it is determined that the vehicle has skidded, the vehicle state detecting portion 46 notifies the road information compensation portion 45 that the vehicle has skidded.

Figure 6:
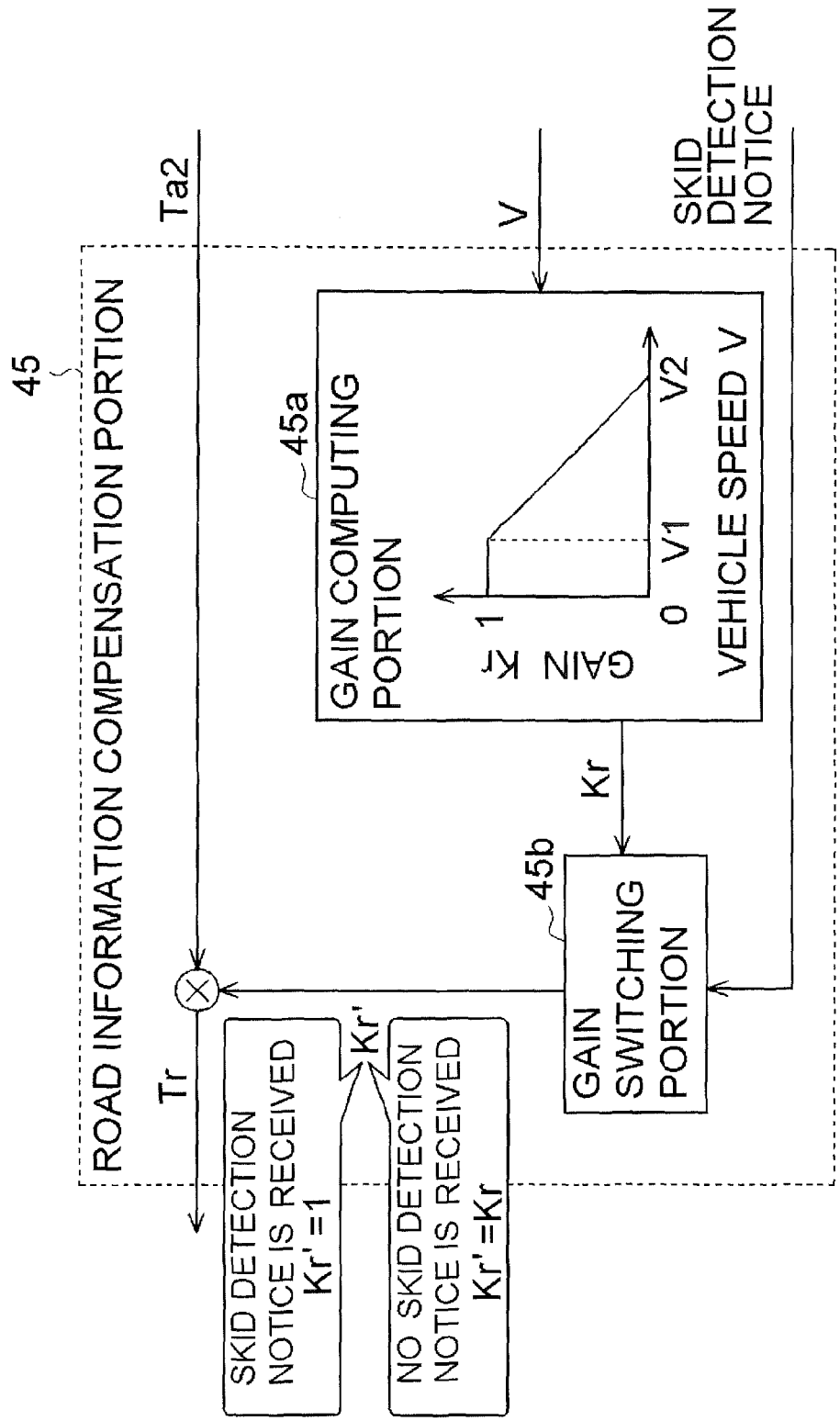
FIG. 6 is a control block diagram illustrating a configuration of a road information compensation portion of the electric power steering system according to the embodiment.

A value of the second assist component Ta2 and the vehicle speed V are taken into the road information compensation portion 45. As illustrated in FIG. 6, the road information compensation portion 45 includes a gain computing portion

45a and a gain switching portion 45b. The gain computing portion 45a computes a gain Kr based on the vehicle speed V. As illustrated in the figure, the gain computing portion 45a sets the gain Kr to "1" when the vehicle runs at a low speed, that is, when vehicle speed V is in a range of "0≤V<V1." Further, when the vehicle runs at an intermediate speed, that is, when the vehicle speed V is in a range of "V1≤V<V2," the gain computing portion 45a decreases the gain Kr linearly in a range from "1" to "0" as the vehicle speed V is increased. Further, when the vehicle runs at a high speed, that is, when the vehicle speed V is in a range of "V2≤V," the gain computing portion 45a sets the gain Kr to "0." The gain computing portion 45a outputs the gain Kr thus computed, to the gain switching portion 45b.

Figure 7:
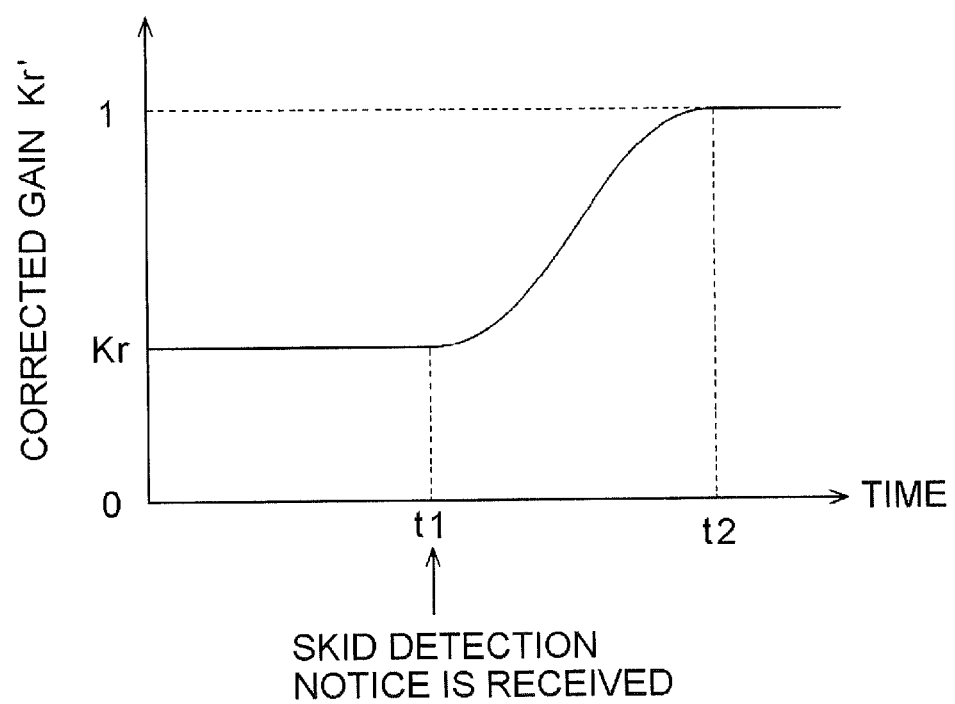
FIG. 7 is a time chart illustrating an example of a manner in which a road information gain is corrected by a road information change portion of the electric power steering system according to the embodiment.

The gain switching portion 45b corrects the gain Kr based on a skid detection notice from the vehicle state detecting portion 46, and outputs a corrected gain Kr'. More specifically, when receiving the skid detection notice from the vehicle state detecting portion 46 at a time t1 as illustrated in FIG. 7, the gain switching portion 45b gradually increases the gain Kr until its value reaches "1," and when the gain Kr reaches "1" (at a time t2), the gain switching portion 45b maintains its value. Note that if a value of the gain Kr is "1" at the time when the gain switching portion 45b receives the skid detection notice, the gain switching portion 45b maintains the value of the gain Kr without changing. Further, in a case where the gain switching portion 45b does not receive the skid detection notice from the vehicle state detecting portion 46, the gain switching portion 45b outputs the value of the gain Kr as the corrected gain Kr'.

Then, the road information compensation portion 45 computes the correction value Tr by multiplying the second assist component Ta2 by the corrected gain Kr' thus computed by the gain switching portion 45b.

Next, actions in the present embodiment will be described. In a case where the vehicle does not skid, the gain switching portion 45b does not correct the gain Kr. Therefore, as illustrated in FIG. 6, a relation "Kr=Kr'" is established between the gain Kr before correction and the corrected gain Kr'. In this case, the corrected first assist component Ta1' and the assist command value Tas are calculated according to the vehicle speed V, as shown in the following (b1) to (b3).

(b1) The time when the vehicle runs at a low speed, that is, when the vehicle speed V satisfies the condition of "0≤V<V1." In this case, the corrected gain Kr' is set to "1," and thus, the correction value Tr is a value equal to the second assist component Ta2. Therefore, the corrected first assist component Ta1' is "Ta1−Ta2." Accordingly, the assist command value Tas is "Ta1."

(b2) The time when the vehicle runs at an intermediate speed, that is, when the vehicle speed V satisfies the condition of "V1≤V<V2." In this case, since the corrected gain Kr' varies in a range of "1≤K>0," the correction value Tr varies in a range of "Ta2≥Tr>0." Therefore, the corrected first assist component Ta1' is "Ta1−Kr·Ta2." Accordingly, the assist command value Tas is "Ta1+(1−Kr)Ta2."

(b3) The time when the vehicle runs at a high speed, that is, when the vehicle speed V satisfies the condition of "V2≤V." In this case, the corrected gain Kr' is set to "0," and thus, the correction value Tr is "0." Therefore, the corrected first assist component Ta1' is "Ta1." Accordingly, the assist command value Tas is "Ta1+Ta2."

As such, the road information compensation portion 45 of the present embodiment serves as a compensation portion that decreases the absolute value of the second assist component Ta2 included in the assist command value Tas in accordance with the vehicle speed V.

In this configuration, when the vehicle runs at a low speed, the second assist component Ta2 included in the assist command value Tas is completely eliminated. As a result, the assist torque caused due to the steered-angle feedback control does not act on the steering shaft 11. Accordingly, the reverse input from the steered wheels 15 is transmitted to the driver without being cancelled, and thus, the driver is able to obtain the road information. Meanwhile, as the vehicle speed V is increased, the second assist component Ta2 included in the assist command value Tas is increased, which causes the assist torque due to the steered-angle feedback control to act on the steering shaft 11. Particularly, when the vehicle runs at a high speed, that is, when the vehicle speed V is equal to or higher than the speed V2, it is possible to cancel the reverse input from the steered wheels 15 by the assist torque caused due to the steered-angle feedback control. As a result, it is possible to appropriately secure vehicle running stability when the vehicle runs at a high speed.

In the meantime, when the vehicle skids, the corrected gain Kr' is set to "1" as illustrated in FIG. 6. Accordingly, the assist command value Tas is "Ta1," similarly to the case of (b1). That is, the assist torque caused due to the steered-angle feedback control does not act on the steering shaft 11. Thus, the assist torque for matching the steered angle θp of the steered wheels 15 with the steered-angle command value θp* does not act on the steering mechanism 1. Thus, when the vehicle skids and the driver performs counter steering, the assist torque acting on the steering mechanism 1 in the reverse direction with respect to the direction of the counter steering is eliminated, and thus, it is possible to remove the sense of discomfort felt by the driver.

Further, the gain switching portion 45b of the present embodiment gradually increases the corrected gain Kr' to "1" when the vehicle has skidded. This gradually decreases the second assist component Ta2 included in the assist command value Tas, thereby making it possible to suppress a sudden change of the assist torque. As a result, it is possible to suppress a sudden change of the steering feel, thereby making it possible to reduce the sense of discomfort felt by the driver.

As described above, according to the electric power steering system of the present embodiment, the following effects are obtained.

(1) The assist command value computing portion 40 includes the vehicle state detecting portion 46 that detects a skid of the vehicle. When the vehicle state detecting portion 46 detects a skid of the vehicle, the absolute value of the second assist component Ta2 included in the assist command value Tas is decreased, as compared to when no skid of the vehicle is detected. This makes it possible to reduce the sense of discomfort felt by the driver when the vehicle skids and the driver performs counter steering.

(2) When the assist command value computing portion 40 decreases the absolute value of the second assist component Ta2 included in the assist command value Tas, the assist command value computing portion 40 gradually decreases the absolute value. Thus, it is possible to suppress a sudden change of the assist command value Tas, thereby making it possible to suppress a sudden change of the steering feel. Accordingly, the driver does not feel the sense of discomfort.

(3) In the assist command value computing portion 40, the road information compensation portion 45 functions as an adjustment portion that decreases the absolute value of the second assist component Ta2 included in the assist command value Tas at the time when a skid of the vehicle is detected. Thus, it is possible to omit redundant arithmetic processing as compared to a case where the assist command value computing portion 40 and the road information compensation portion 45 (adjustment portion) are provided separately. Thus, it is possible to reduce a computation load.

Note that the above embodiment may be implemented in the following embodiments in which the above embodiment is modified appropriately.

In the above embodiment, the gain Kr is changed according to the vehicle speed V. However, at the time of braking, it is desirable to bring the gain Kr close to "1" in a manner such that the second assist component Ta2 included in the assist command value Tas does not become too small. At the time of braking, vibration having a relatively high frequency, which is easily recognized as noise, occurs. However, by performing the steered-angle feedback control to effectively exert a vibration suppressing action as described above, it is possible to effectively suppress the reverse input vibration that becomes noise. Further, if the gain Kr is not set to "1," the driver is able to obtain road information.

In the above embodiment, the second assist component Ta2 included in the assist command value Tas is adjusted by use of the road information compensation portion 45. Instead of this, the second assist component Ta2 included in the assist command value Tas may be adjusted, for example, by changing the ideal model of the steered-angle command value computing portion 42. More specifically, the skid detection notice from the vehicle state detecting portion 46 is taken into the steered-angle command value computing portion 42. If the steered-angle command value computing portion 42 receives the skid detection notice from the vehicle state detecting portion 46, respective values of the coefficients K, C, and J are changed so that the second assist component Ta2 included in the assist command value Tas is decreased. Note that the assist torque acting on the steering mechanism 1 in the reverse direction with respect to the direction of counter steering at the time when the driver performs the counter steering is caused mainly due to the spring term "K×θp" included in the second assist component Ta2. In view of this, in a case where the steered-angle command value computing portion 42 receives the skid detection notice from the vehicle state detecting portion 46, it is possible to effectively reduce the sense of discomfort felt by the driver by decreasing the spring coefficient K.

In the above embodiment, the value of the corrected gain Kr' is set to "1" at the time when a skid of the vehicle is detected. However, instead of this, the value of the corrected gain Kr' may be set to a value smaller than "1." In other words, instead of the method in which the second assist component Ta2 included in the assist command value Tas is completely eliminated when a skid of the vehicle is detected, a method may be employed, in which the absolute value of the second assist component Ta2 included in the assist command value Tas is decreased. Even in this configuration, when a skid of the vehicle is detected, the assist torque, which acts due to the steered-angle feedback control at the time of counter steering, is decreased. Thus, it is possible to reduce the sense of discomfort felt by the driver. Further, the reverse input vibration from the steered wheels 15 is not cancelled completely, and therefore, the driver is able to obtain the road information.

In the above embodiment, the value of the corrected gain Kr' is gradually increased to "1" at the time when a skid of the vehicle is detected. However, instead of this, the value of the corrected gain Kr' may be set to "1" at the time when a skid of the vehicle is detected. In other words, at the time when a skid of the vehicle is detected, the assist command value Tas may be adjusted so that the second assist component Ta2 becomes invalid immediately.

In the above embodiment, the invention is applied to the electric power steering system provided with the road information compensation portion 45. However, the invention is also applicable to an electric power steering system that is not provided with the road information compensation portion 45. In this case, a compensation portion, which decreases the absolute value of the second assist component Ta2 included in the assist command value Tas at the time when a skid of the vehicle is detected, may be provided separately.

In the above embodiment, the model exemplified in FIG. 5 is used as the ideal model used in the steered-angle command value computing portion 42, but the ideal model may be modified appropriately. For example, an ideal model in which the steered-angle command value θp* is set based on only the steering torque Th may be used.

The steered-angle command value computing portion 42 is not limited to one that computes the steered-angle command value θp* with the use of the ideal model. For example, like the basic assist component computing portion 41, the steered-angle command value computing portion 42 may compute the steered-angle command value θp* with the use of a map.

In the above embodiment, the rotation angle sensor 7 and the steered-angle computing portion 44 are employed as a detecting portion that detects the steered angle θp of the steered wheels 15. However, the invention is not limited to this configuration. For example, a sensor that detects the rotation angle of the steering shaft 11, a sensor that directly detects the steered angle θp of the steered wheels 15, and the like may be employed.

The steered-angle feedback control may be performed by using the rotation angle of an appropriate rotary shaft, which can be converted to the steered angle θp, such as a rotation angle of the intermediate shaft 11b or a rotation angle of the pinion shaft 11c.

The basic assist component computing portion 41 sets the first assist component Ta1 based on the steering torque Th and the vehicle speed V. However, the first assist component Ta1 may be set based on only the steering torque Th, for example. Further, a so-called phase compensation control may be performed to change a phase of the detected steering torque Th from the torque sensor 4, based on a change gradient (an assist gradient) of the first assist component Ta1 with respect to the steering torque Th. Further, a so-called torque differential control may be performed to increase the first assist component Ta1 as a differential value of the first assist component Ta1 is increased.

In the above embodiment, a skid of the vehicle is detected based on the yaw rate YR of the vehicle body and its estimated value YRe. However, the method of detecting a skid of the vehicle is not limited to this method. For example, in a case where the vehicle is provided with a device that performs a stability control for the vehicle so as to restrain a skid of the vehicle at the time when the skid is detected, the skid of the vehicle may be detected based on a notice from the stability control device.

In the above embodiment, the invention is applied to the electric power steering system that gives the assist torque to the column shaft 11a. Instead of this, the invention may be applied to an electric power steering system that gives the assist torque to the pinion shaft 11c, or an electric power steering system that gives the assist torque to the rack shaft 13.

What is claimed is:
1. An electric power steering system comprising:
an assist mechanism that gives an assist torque from a motor to a vehicle steering mechanism;
a control portion that controls driving of the motor based on an assist command value; and a vehicle state detecting portion that detects a skid of the vehicle, wherein the control portion includes:
- a first assist component computing portion that computes a first assist component based on a steering torque transmitted to the vehicle steering mechanism;
- a steered-angle command value computing portion that computes, based on the steering torque, a steered-angle command value that serves as a target value for a steered angle of steered wheels;
- a second assist component computing portion that computes a second assist component by performing a steered-angle feedback control that matches the steered angle of the steered wheels with the steered-angle command value;
- an assist command value computing portion that computes the assist command value based on a value obtained by adding the second assist component to the first assist component; and
- an adjustment portion that decreases, when the skid of the vehicle is detected by the vehicle state detecting portion, an absolute value of the second assist component included in the assist command value, as compared to when no skid of the vehicle is detected, the adjustment portion includes:
  - a gain computing portion that computes a gain based on vehicle speed such that: (1) the gain is set at 1 when the vehicle speed is at a predetermined speed or lower, and (2) the gain is decreased linearly in a range from 1 to 0 when the vehicle speed is increased above the predetermined speed,
  - a gain switching portion that corrects the gain when the skid of the vehicle is detected by increasing the gain until the gain has a value of 1.

2. The electric power steering system according to claim 1, wherein when the adjustment portion decreases the absolute value of the second assist component included in the assist command value, the adjustment portion gradually decreases the absolute value.

3. The electric power steering system according to claim 1, wherein:

the control portion includes a compensation portion that decreases the absolute value of the second assist component included in the assist command value in accordance with a vehicle state; and the compensation portion functions as the adjustment portion.

4. The electric power steering system according to claim 1, wherein:

the control portion computes a driving torque by adding the first assist component to the steering torque;

the steered-angle command value computing portion computes the steered-angle command value based on an ideal model of the steered angle with respect to the driving torque; and the adjustment portion decreases the absolute value of the second assist component included in the assist command value by changing the ideal model.

* * * * *